United States Patent [19]
Mizuno et al.

[11] Patent Number: 5,139,894
[45] Date of Patent: Aug. 18, 1992

[54] FUEL CELL SYSTEM

[75] Inventors: Yutaka Mizuno; Toshiharu Hanajima; Hisayoshi Matsubara, all of Iwata, Japan

[73] Assignee: Yamaha Hatsudoki Kabushiki Kaisha, Iwata, Japan

[21] Appl. No.: 517,871

[22] Filed: May 2, 1990

[30] Foreign Application Priority Data

May 2, 1989 [JP] Japan ................................. 1-112252

[51] Int. Cl.$^5$ .......................................... H07M 16/00
[52] U.S. Cl. .......................................... 429/9; 429/19
[58] Field of Search ............................ 429/9, 19, 21

[56] References Cited
U.S. PATENT DOCUMENTS

| 3,546,020 | 12/1970 | Berger | 429/9 |
| 4,000,003 | 12/1976 | Baker et al. | 429/9 |
| 4,463,063 | 7/1984 | Adlhart | 429/19 |
| 4,532,192 | 7/1985 | Baker et al. | 429/19 |
| 4,677,037 | 6/1987 | Takabayashi | 429/9 |

Primary Examiner—Stephen Kalafut
Attorney, Agent, or Firm—Ernest A. Beutler

[57] ABSTRACT

A number of embodiments of fuel cells including a storage battery which can intermittently supply electrical power to a load. In such embodiment, water vapor generated from the operation of the fuel cell is condensed, purified and returned to the storage battery to replace the water consumed from the electrolyte from the battery operation. The water vapor is reclaimed by a series of condensers and is returned to a purifier. In some embodiments the reclaimed water vapor is delivered to the battery by an intermittently operated pump while in other embodiments the water vapor is returned by a continuously operated pump through some form of overflow device to ensure against dilution of the electrolyte in the battery.

18 Claims, 2 Drawing Sheets

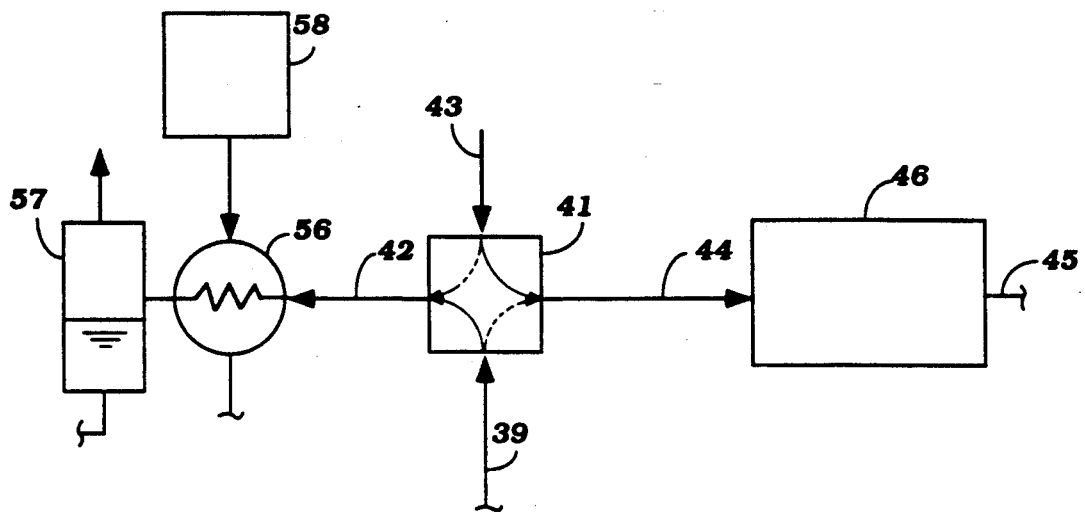
Figure 2
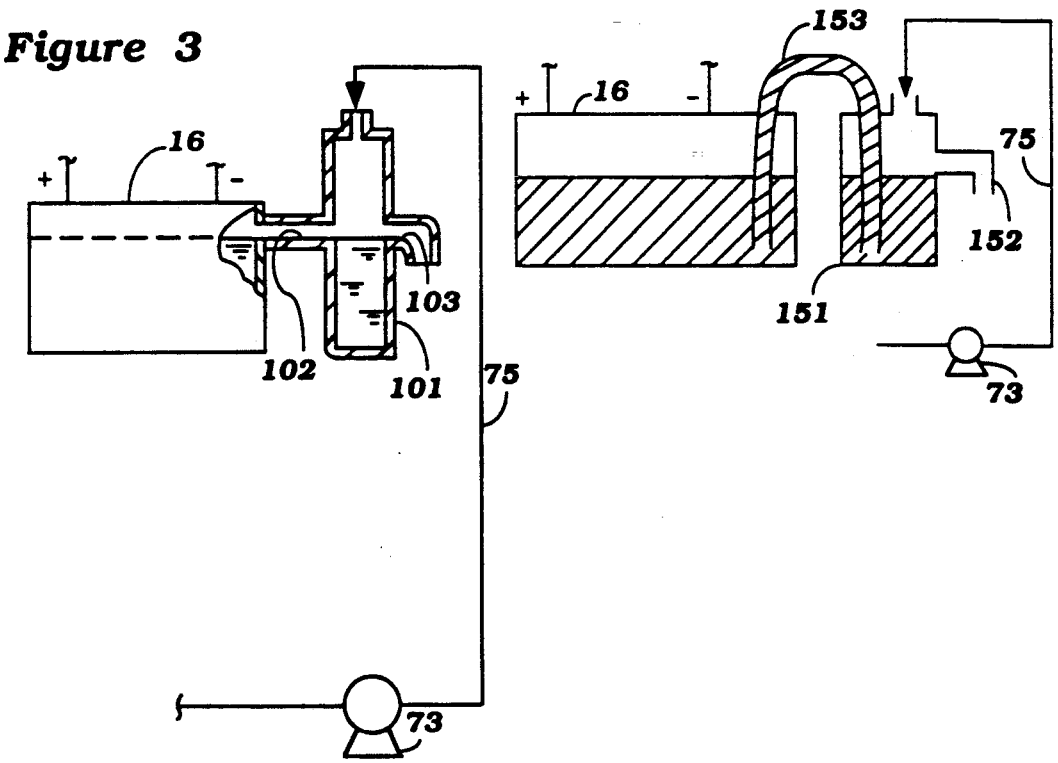
Figure 3
Figure 4

5,139,894

FUEL CELL SYSTEM

BACKGROUND OF THE INVENTION

This invention relates to a fuel cell system and more particularly to a hybrid fuel cell system including a storage battery for operating the load.

In many fuel cell systems the fuel cell is employed for generating electrical power to drive a load. Normally such systems are stationary and operated relatively continuously. There are applications, however, where the fuel cell is employed to power a load that is operated intermittently. For example, it is possible to provide an electrically powered vehicle wherein the electrical power is derived from a fuel cell. As such, the fuel cell is subject to start up and stop operations which presents problems not attendant with normal fuel cell applications. In addition, with such an application there is an advantage to employing a storage battery which can be charged and which can alternately supply additional or supplemental electric power for operating the load.

As is well known, most storage batteries operate with an electrolyte that is water based and the water is consumed by the battery during its operation. Therefore, in order to have these systems be effective, it is necessary for the operator to ensure that the electrolyte level in the battery does not become depleted.

It is, therefore, a principal object of this invention to provide a fuel cell system that includes a storage battery and wherein the vaporous by products from the operation of the fuel cell which contain water are condensed and supplied to the battery as needed.

It is a further object of this invention to provide a fuel cell system that is relatively maintenance free and wherein water vapors generated by the fuel cell operation are reclaimed and supplied to a storage battery.

SUMMARY OF THE INVENTION

This invention is embodied in a fuel cell system for providing electrical power to a load comprising a fuel cell for generating electrical power from a chemical reaction. An electrical storage battery contains an electrolyte which includes water. The fuel cell and the storage battery are both in circuit with the load for supplying electrical power to the load. The fuel cell operation provides a product containing water vapor and means are provided for condensing the water vapor and supplying the condensed water from the vapor to the storage battery to replace the water in its electrolyte consumed by its operation.

BRIEF DESCRIPTION OF THE DRAWINGS

FIG. 2 is an enlarged partial schematic view, showing a portion of the fuel cell system depicted in FIG. 1.

FIG. 3 is a partial schematic view, showing a portion of a fuel cell system constructed in accordance with another embodiment of the invention.

FIG. 4 is a partial schematic view in part similar to FIG. 3, and shows another embodiment of the invention.

DETAILED DESCRIPTION OF THE PREFERRED EMBODIMENTS OF THE INVENTION

Figure 1:
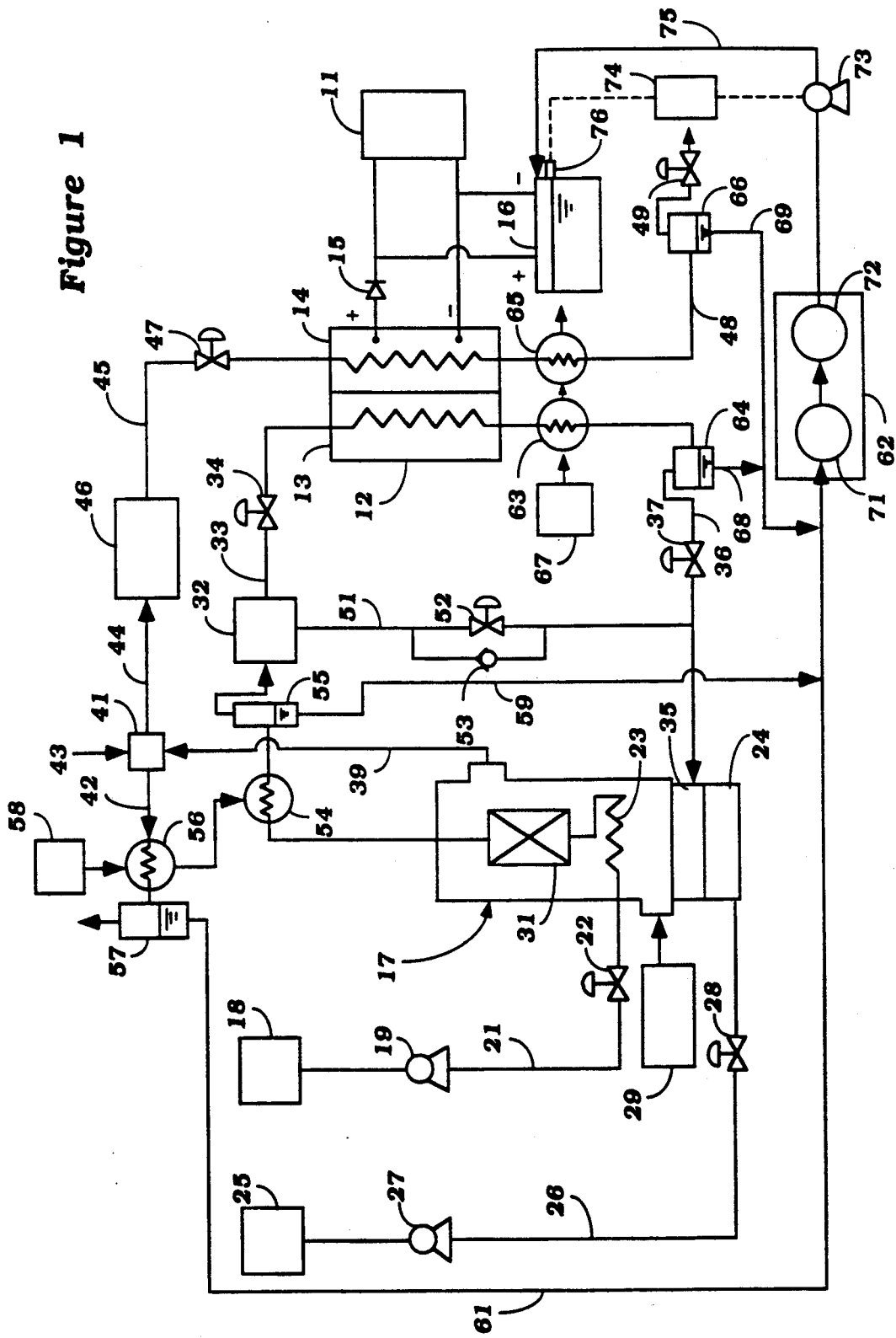
FIG. 1 is a partially schematic view showing a fuel cell system constructed in accordance with a first embodiment of the invention.

Referring now to in detail first to FIG. 1, a hybrid fuel cell system for operating a load such as an electrical motor 11 that may be employed to power a motor vehicle (not shown) is depicted. This hybrid system includes a fuel cell 12 that has a fuel port 13 and an air port 14. As is known, the fuel cell has an interposed electrolytic matrix core so as to generate electrical power upon the reaction of the fuel and air in the fuel cell 11. The positive terminal of the fuel cell 12 is connected to the load 11 through a diode 15 while the negative terminal is connected directly to the load 11. The diode 15 is provided for protection since there is also incorporated a storage battery 16 that is connected, in the illustrated embodiment, in parallel to the fuel cell 12 with the load 11. The storage battery is of the conventional type incorporating an electrolyte that is primarily water based.

The system is such that the fuel cell 12 may charge the battery 16 at such times when the motor 11 is not consuming full power of the fuel cell 12. Also, under such times when the load of the motor 11 exceeds the capacity of the fuel cell 12 the battery 16 can supply additional power.

Fuel is supplied to the fuel port 13 of the fuel cell 12 from a reformer, indicated generally by the reference numeral 17. The reformer 17 received fuel in the form of an appropriate mixture of water and methanol from a fuel tank 18 through a fuel supply pump 19, conduit 21 and fuel control valve 22. The fuel from the valve 22 is supplied to a vaporizer unit 23 of the reformer 17.

The vaporizer 23 is heated by a heater 24 that is supplied with fuel from a heater fuel tank 25 through a line 26 in which a feed pump 27 and control valve 28 are positioned. The fuel for the heater 24 may be of any suitable type, such as methanol.

A blower 29 supplies atmospheric air to the reformer 17 for the combustion and for heating the vaporizer 23. The vaporized fuel is delivered to a catalyst bed 31 for completing the reforming and the reformed fuel is then supplied to a storage tank 32. The storage tank 32 communicates with the fuel inlet port 13 of the fuel cell 12 through a conduit 33 in which a control valve 34 is positioned. Any hydrogen fuel which is not consumed within the fuel cell 11 is returned to a separate burner or heater 35 of the reformer 17 through a conduit 36 in which a control valve 37 is positioned.

An exhaust pipe 39 conveys the combustion products from the reformer 17 to a port of a control valve 41. The control valve 41 has an atmospheric exhaust port 42 and an atmospheric inlet port 43. A supply port 44 selectively supplies either atmospheric air from the port 43 or heated exhaust gases from the exhaust pipe 39 to the air port 14 of the fuel cell 12 through a conduit 45 in which a blower 46 and control valve 47 is provided as shown in FIG. 2. In the normal running condition of the control valve 41 it supplies atmospheric air to the air port 14 from the atmospheric inlet 43 and conduit 44. Exhaust gases from the reformer 17 are, however, returned to the atmosphere through the exhaust port 42.

During start up the valve 41 is shifted to a position as is described in the copending application Ser. No. 427,756, entitled "Fuel Cell System", filed Oct. 26, 1989 and assigned to the Assignee of this application. In this condition, exhaust gases from the exhaust pipe 39, which still contain a sufficient quantity of air for operation of fuel cell 12, are delivered to the air port 14 and the atmospheric air port 43 communicates with the exhaust port 42. The supply of heated exhaust gases to the air port 14 will help in assisting the bringing of the fuel cell 12 up to its operating temperature.

The fuel cell 12 has an exhaust port 48 in which a control valve 49 is provided. In addition, there is provided a bypass conduit 51 that extends from the fuel cell reservoir 32 back to the burner 35. A control valve 52 is positioned in the bypass line 51 and is normally closed during running of the system once the fuel cell 12 and reformer 17 are at their operating temperature. A relief valve 53 is in bypass position around the control valve 52 for protection purposes.

As should be readily apparent, as the storage battery 16 supplies electrical power to the motor 11, the water in the electrolyte will be depleted. This normally requires servicing. That is, the operator must periodically top up the storage battery 16 with water so as to ensure its safe operation.

In the operation of the fuel cell 12 and specifically the cell itself and the reformer 17, there is a fair amount of water vapor generated by the various chemical reactions. In accordance with invention, this water vapor is reclaimed and condensed. The reclaimed and condensed water vapor is then purified and delivered to the storage battery 16 so as to replace the depleted water.

In essence, the recovery system includes a number of condensers, accumulating tanks and a purifying system. For example, the reformed fuel generated from the reformer 17 will include water vapor and this water vapor is passed through a condenser 54 before delivery to the storage tank 32. A water storage tank 55 is positioned downstream of the condenser 54 and upstream of the fuel storage tank 32 for accumulating the condensed water. In addition, the exhaust gases from the reformer 17 also contain water vapor. During the phase of operation when the control valve 41 is in a position so that these exhaust gases are being delivered to the atmosphere through the port 42, they are passed across a further condenser 56 and the condensed water is delivered to a storage tank 57 before discharge to the atmosphere. The condensers 54 and 56 are each supplied with a cool air source from a blower 58 so that the air flow is in series from the condenser 56 to the condenser 54 as shown by the arrows in FIG. 1.

The condensed water tanks 55 and 57 each have respective return lines 59 and 61 that deliver the condensed water to a purifying unit, indicated generally by the reference numeral 62 and having a construction as will be described.

The exhaust products from the fuel port 13 of the fuel cell 12 and the from air port 14 of the fuel cell 12 also have water vapor in them. A first condenser 63 is provided in the discharge from the fuel port 13 upstream of the control valve 37 in the conduit 36. A water storage tank 64 is provided between the condenser 63 and the control valve 37 for storing the condensed water. In a similar manner, a condenser 65 condenses the water from the air exhaust port and delivers this condensed water to a storage tank 66 before the control valve 49. The condenser, 63 and 65 are provided with a source of cool air from a blower 67. Again, the flow is in series arrangement from the condenser 63 to the condenser 65 as shown by the arrows in this figure. The storage tank 66 communicates the condensed water with the purifying device 62 through a return line 68. In a like manner, the tank 66 communicates with the purifying device 62 through a return line 69.

The purifying device 69 includes an ion exchange resin unit 71 and an activated charcoal filter 72. The purifying device 62 delivers this purified water to a feed pump 73 which may be electrically operated and which, in turn, is operated by a controller 74 to deliver the water back to the battery 16 through a line 75. The controller 74 cooperates with an electrolyte level sensor 76 positioned within the storage battery 16 and activates the pump 73 when the electrolyte level has fallen below the sensor 76. When the electrolyte level is replenished, the sensor 76 and controller 74 cooperates so as to shut off the pump 73.

In the embodiment of the invention as thus far described, the water is supplied to the battery 16 under an intermittently operated pump 73 which requires a water level sensor and controller. FIG. 3 is a partial view showing another embodiment of the invention wherein such a control circuit is not required. Because of the similarity of this embodiment to the previously described embodiment and since only the manner in which water return is controlled differs from the previously embodiment, only this portion is illustrated. As may be seen, the pump 73 in this embodiment is operated continuously and supplies the return water to a control device 101 which has a first port 102 that communicates with the electrolyte of the battery 16 and a discharge port 103 that can go to either a drain or back to a storage tank. There is a trap like action in the device 101 and as will be seen once the electrolyte level is maintained normal, returned water will overflow the line overflow through the return 103. Thus, the pump 73 can be operated continuously and a separate control circuit is not required for it.

In the embodiment of FIG. 3, there is the possibility that electrolyte may become depleted and water may not be delivered by the pump 73 during brief intervals. FIG. 4 shows another embodiment which is generally the same but employs a different type of device that provides a water reservoir that stores a volume of reclaimed water. In this embodiment, the pump 73 delivers water to a reservoir device 151 which has an over flow return 152 that can either go to a drain or a storage tank. A siphon tube 153 interconnects the tank 151 with the storage battery 16 and the electrolyte level in the battery 16 will be maintained at the elevation of the drain line 152. if desired a check valve may be included in the siphon tubes to prevent tank 151 from flowing back from the battery 16 to the reservoir tank 151.

It should be apparent from the foregoing description that a number of embodiments of fuel cell systems have been illustrated that employ storage batteries which are supplied with water to replace that consumed during the operation from condensation in the various systems of the fuel cell. As a result, the devices illustrated are substantially maintenance free. Although a number of the embodiments of the invention have been illustrated and described, various changes and modifications may be made without departing from the spirit and scope of the invention as defined by the appended claims.

We claim:

1. A fuel cell system for providing electrical power to a load comprising a fuel cell system for generating electrical power from a chemical reaction, a reformer for reforming fuel supplied to a fuel cell of said fuel cell system, said reformer discharging a waste product including water vapor in its operation, an electrical storage battery containing an electrolyte including water, said fuel cell system and said electrical storage battery both being in circuit with said load for supplying electrical power for said load, means for condensing said water vapor, and means for supplying the condensed water from the vapor to said storage battery to replace the water in its electrolyte consumed by its operation.

2. A fuel cell system for providing electrical power as set for in claim 1, wherein water is also reclaimed from the water vapor in the exhaust from the fuel cell system.

3. A fuel cell system for providing electrical power as set forth in claim 1, wherein the water vapor is recovered from the exhaust of the reformer.

4. A fuel cell system for providing electrical power as set forth in claim 3, wherein the water is also reclaimed from the water vapor contained within the reformed fuel.

5. A fuel cell system for providing electrical power as set forth in claim 1, wherein the reclaimed water is passed through a water purifier before being delivered to the electrical storage battery.

6. A fuel cell system for providing electrical power as set forth in claim 1, wherein the reclaimed water is supplied to the storage battery in response to the change of level of electrolyte in the battery.

7. A fuel cell system for providing electrical power as set forth in claim 6, wherein the reclaimed water is delivered to the storage battery by an intermittently operated pump.

8. A fuel cell system for providing electrical power as set forth in claim 6, wherein the reclaimed water is delivered back to the storage battery through a system having an overflow so that the reclaimed water is continuously returned.

9. A fuel cell system for providing electrical power as set forth in claim 8, wherein the reclaimed water is delivered to a storage tank that communicates with the storage battery through a siphon and which has an overflow.

10. A fuel cell system as set forth in claim 1, wherein the fuel cell is powered by a chemical reaction generated independently of the storage battery.

11. A fuel cell system for providing electrical power as set forth in claim 10, wherein water is also reclaimed from the water vapor in the exhaust from the fuel cell system.

12. A fuel cell system for providing electrical power as set forth in claim 10, wherein the water vapor is recovered from the exhaust of the reformer.

13. A fuel cell system for providing electrical power as set forth in claim 12, wherein the water is also reclaimed from the water vapor contained within the reformed fuel.

14. A fuel cell system for providing electrical power as set forth in claim 10, wherein the reclaimed water is passed through a water purifier before being delivered to the electrical storage battery.

15. A fuel cell system for providing electrical power as set forth in claim 10, wherein the reclaimed water is supplied to the storage battery in response to the change of level of electrolyte in the battery.

16. A fuel cell system for providing electrical power as set forth in claim 15, wherein the reclaimed water is delivered to the storage battery by an intermittently operated pump.

17. A fuel cell system for providing electrical power as set forth in claim 15, wherein the reclaimed water is delivered back to the storage battery through a system having an overflow so that the reclaimed water is continuously returned.

18. A fuel cell system for providing electrical power as set forth in claim 17, wherein the reclaimed water is delivered to a storage tank that communicates with the storage battery through a siphon and which has an overflow.

* * * * *